United States Patent
Mullin et al.

(10) Patent No.: US 11,663,347 B2
(45) Date of Patent: May 30, 2023

(54) SYSTEMS AND METHODS FOR MAINTAINING IMMUTABLE DATA ACCESS LOGS WITH PRIVACY

(71) Applicant: JPMORGAN CHASE BANK, N.A., New York, NY (US)

(72) Inventors: Andrew J. Mullin, Cypress, TX (US); Jason S. Thacker, Cypress, TX (US); Nicholas R. Adam, The Woodlands, TX (US); Hai Van Nguyen, Houston, TX (US); Binh Nguyen, Sugarland, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 327 days.

(21) Appl. No.: 16/396,016

(22) Filed: Apr. 26, 2019

(65) Prior Publication Data

US 2020/0342127 A1    Oct. 29, 2020

(51) Int. Cl.
| | |
|---|---|
| *H04L 29/06* | (2006.01) |
| *G06F 21/62* | (2013.01) |
| *G06F 21/60* | (2013.01) |
| *H04L 9/30* | (2006.01) |

(Continued)

(52) U.S. Cl.
CPC ............ *G06F 21/62* (2013.01); *G06F 21/602* (2013.01); *H04L 9/30* (2013.01); *H04L 9/3297* (2013.01); *H04L 9/50* (2022.05)

(58) Field of Classification Search
CPC ......... G06F 21/62; G06F 21/602; H04L 9/30; H04L 9/3297; H04L 2209/38
See application file for complete search history.

(56) References Cited

U.S. PATENT DOCUMENTS

| | | | |
|---|---|---|---|
| 9,397,985 B1 * | 7/2016 | Seger, II | H04L 63/0442 |
| 9,646,168 B2 | 5/2017 | Park et al. | |
| 10,516,525 B2 * | 12/2019 | Bhattacharya | H04L 9/0637 |

(Continued)

FOREIGN PATENT DOCUMENTS

| | | |
|---|---|---|
| CN | 109614806 | 4/2019 |

OTHER PUBLICATIONS

International Search Report, dated Jun. 12, 2020, from corresponding International Application No. PCT/US2020/022269.

(Continued)

*Primary Examiner* — Beemnet W Dada
*Assistant Examiner* — Leynna Truvan
(74) *Attorney, Agent, or Firm* — Greenberg Traurig LLP

(57) ABSTRACT

Systems and methods for maintaining immutable data access logs with privacy are disclosed. In one embodiment, in a cloud provider comprising at least one computer processor, the cloud provider having a plurality of clients, a method for maintaining immutable data access logs with privacy may include: (1) receiving data from a data owner, wherein the data owner is one of the clients; (2) storing the data in cloud storage; (3) executing an action or condition that impacts the data stored in cloud storage; (4) generating a log entry associated with the action or condition; (5) encrypting at least a portion of the log entry with a public key for the data owner; and (6) committing the log entry including the encrypted portion to a distributed ledger so that the committed log entry is immutable and cryptographically verifiable.

17 Claims, 3 Drawing Sheets

(51) Int. Cl.
*H04L 9/32* (2006.01)
*H04L 9/00* (2022.01)

(56) References Cited

U.S. PATENT DOCUMENTS

| | | | |
|---|---|---|---|
| 10,536,445 B1* | 1/2020 | Lerner | H04L 9/3239 |
| 10,805,072 B2* | 10/2020 | Corduan | G06Q 20/385 |
| 2004/0054908 A1* | 3/2004 | Circenis | G06F 21/645 |
| | | | 713/176 |
| 2016/0306982 A1 | 10/2016 | Seger, II et al. | |
| 2017/0177898 A1 | 6/2017 | Dillenberger | |
| 2017/0250972 A1* | 8/2017 | Ronda | H04L 63/123 |
| 2018/0219883 A1* | 8/2018 | Li | H04L 63/1425 |
| 2019/0087597 A1 | 3/2019 | Hunt et al. | |
| 2020/0092088 A1* | 3/2020 | Novotny | H04L 9/14 |

OTHER PUBLICATIONS

Written Opinion of the International Searching Authority, dated Jun. 12, 2020, from corresponding International Application No. PCT/US2020/022269.

* cited by examiner

SYSTEMS AND METHODS FOR MAINTAINING IMMUTABLE DATA ACCESS LOGS WITH PRIVACY

BACKGROUND OF THE INVENTION

1. Field of the Invention

The present disclosure generally relates to systems and methods for maintaining immutable data access logs with privacy.

2. Description of the Related Art

Cloud services that do not truly implement bring your own key (BYOK) or hold your own key (HYOK) may expose their clients to unnecessary risks. Any mishandling of the keys, which are stored by and used by the cloud service provider, may compromise all cloud-stored data, and may also be undetectable by the client.

The next best control available is visibility into the key management systems within the cloud environment, but that also relies on the cloud provider not to manipulate or withhold an access log. Further, the cloud provider must protect itself and its other clients from exposing too much information in the logs themselves. This requires the cloud provider to strictly limit access and optionally redact portions of the log entries.

SUMMARY OF THE INVENTION

Systems and methods for maintaining immutable data access logs with privacy are disclosed. In one embodiment, in a cloud provider comprising at least one computer processor, the cloud provider having a plurality of clients, a method for maintaining immutable data access logs with privacy may include: (1) receiving data from a data owner, wherein the data owner is one of the clients; (2) storing the data in cloud storage; (3) executing an action or condition that impacts the data stored in cloud storage; (4) generating a log entry associated with the action or condition; (5) encrypting at least a portion of the log entry with a public key for the data owner; and (6) committing the log entry including the encrypted portion to a distributed ledger so that the committed log entry is immutable and cryptographically verifiable.

In one embodiment, the data received from the data owner may be encrypted.

In one embodiment, the action or condition may include accessing the data stored in cloud storage.

In one embodiment, the action or condition may include encrypting or decrypting the data stored in cloud storage.

In one embodiment, the action or condition may include an environmental change for the data stored in cloud storage.

In one embodiment, the action or condition may include a security event with the data stored in cloud storage.

In one embodiment, the action or condition may be part of a service provided by the cloud provider.

In one embodiment, the public key may be maintained in a public key infrastructure by the cloud provider.

In one embodiment, the log entry may include a timestamp for the action or condition, an identification of a system associated with the action or condition, an identification of at least a portion of the data that was accessed, etc.

In one embodiment, the distributed ledger may be a Blockchain-based distributed ledger or an Ethereum-based distributed ledger.

According to another embodiment, a system that maintains immutable data access logs with privacy is disclosed. The system may include a cloud provider comprising at least one computer processor, the cloud provider having a plurality of clients, and a distributed ledger. The cloud provider may receive data from a data owner, wherein the data owner is one of the clients; may store the data in cloud storage; may execute an action or condition that impacts the data stored in cloud storage; may generate a log entry associated with the action or condition; may encrypt at least a portion of the log entry with a public key for the data owner; and may commit the log entry including the encrypted portion to a distributed ledger so that the committed log entry is immutable and cryptographically verifiable.

In one embodiment, the data received from the data owner may be encrypted.

In one embodiment, the action or condition may include accessing the data stored in cloud storage.

In one embodiment, the action or condition may include encrypting or decrypting the data stored in cloud storage.

In one embodiment, the action or condition may include an environmental change for the data stored in cloud storage.

In one embodiment, the action or condition may include a security event with the data stored in cloud storage.

In one embodiment, the action or condition may be part of a service provided by the cloud provider.

In one embodiment, the public key may be maintained in a public key infrastructure by the cloud provider.

In one embodiment, the log entry may include a timestamp for the action or condition, an identification of a system associated with the action or condition, an identification of at least a portion of the data that was accessed, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for immutable logs with privacy.

Embodiments may apply a system of cryptographically guaranteed assurance to the log collection, storage, and access systems supporting the cloud architecture. For example, using a distributed ledger, such as a Blockchain, Ethereum, or other suitable distributed ledger that may use a consensus model to store the log entries in a way that is tamper evident (e.g., cryptographically verifiable) and immutable. In addition, embodiments may use a policy to drive which parts of log entries need to be encrypted, then encrypt those parts (or whole entries) with private key encryption before committing them to the distributed ledger.

In embodiments, the software and the implementation of technical controls becomes auditable by a third party, which adds layers of assurance not previously achievable in cloud services.

Figure 1:
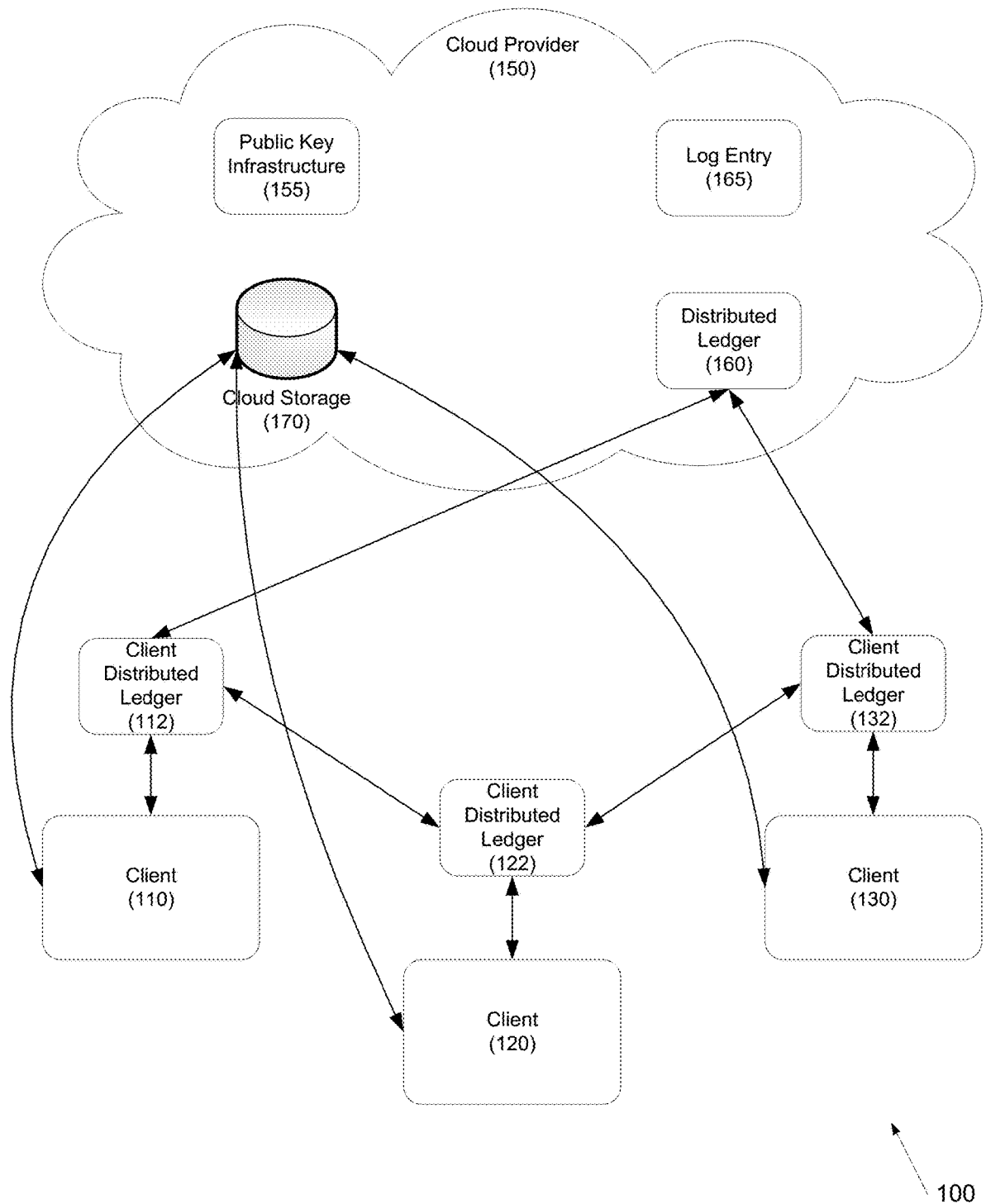
FIG. 1 depicts a system for maintaining immutable data access logs with privacy according to one embodiment.

Referring to FIG. 1, a system for immutable logs with privacy is disclosed according to one embodiment. System 100 may include cloud provider 150, which may include public key infrastructure 155, distributed ledger 160, log entry 165, and cloud storage 170.

System 100 may further include clients 110, 120, and 130, and each client may maintain or be associated with a distributed ledger 115, 125, and 135, respectively. Although FIG. 1 depicts three clients 110, 120, and 130, it should be noted that fewer or a greater number of clients may be provided as is necessary and/or desired.

Cloud provider 150 may be any suitable cloud provider, and may provide services, such as software as a service. Cloud provider 150 may provide one or more worker systems (not shown) that provide the services.

Cloud provider 150 may receive data from clients 110, 120, 130 and may maintain the data in cloud storage 170. In one embodiment, the data may be received in any suitable manner. For example, the data may be encrypted by one of clients 110, 120, 130, transported to cloud provider 150, and decrypted when it is received by cloud provider 150.

In another embodiment, the data that is maintained by cloud provider 150 may be generated by cloud provider 150 or by a third party (not shown). Examples of such data may include a consolidated/processed data feed from some other system, information specific to cloud provider 150's systems (e.g., configuration data), etc.

Data stored in cloud storage may be encrypted at rest using a key maintained by cloud provider 150. In one embodiment, data for each client 110, 120, 130 may be encrypted with a different key for each client 110, 120, 130.

Public key infrastructure 155 may maintain public keys for clients 110, 120, and 130. The public keys stored in public key infrastructure 155 may be used to encrypt log entry 165.

Log entry 165 may reflect any action or condition that may impact the availability or access to the data stored in cloud storage 170. Examples may include the receipt data by cloud provider 150, the generation of data by cloud provider 150 or a third party, encryption and/or decryption of the data, access attempts to the data, environmental changes, security events, etc. In one embodiment, actions related to any other virtual resources (e.g., virtual desktops, server infrastructure, etc.) that are managed by cloud provider 150 on behalf of the client 110, 120, 130 may be logged.

In one embodiment, log entry 165 may include a timestamp for the access, the accessing system, the data that was accessed, the action requested (e.g., read, write, delete), a resulting action (e.g., allow, deny, invalid), a destination system (e.g., the system processing the request), etc.

In one embodiment, certain parts, or all, of log entry may be encrypted using the public key for the data owner (e.g., client 110, 120, 130). In one embodiment, data that is deemed confidential to cloud provider 150, unnecessary to disclose, etc. may be further encrypted. For example, an IP address for a working system in cloud storage 150 may be encrypted, or otherwise prevented from disclosure to clients 110, 120, 130. Other examples may include the logging of activity of other customers or tenants of the cloud service, access to the customer data by law enforcement (e.g., where a gag order prevents cloud provider 150 from disclosing the nature of the access), etc.

Figure 2:
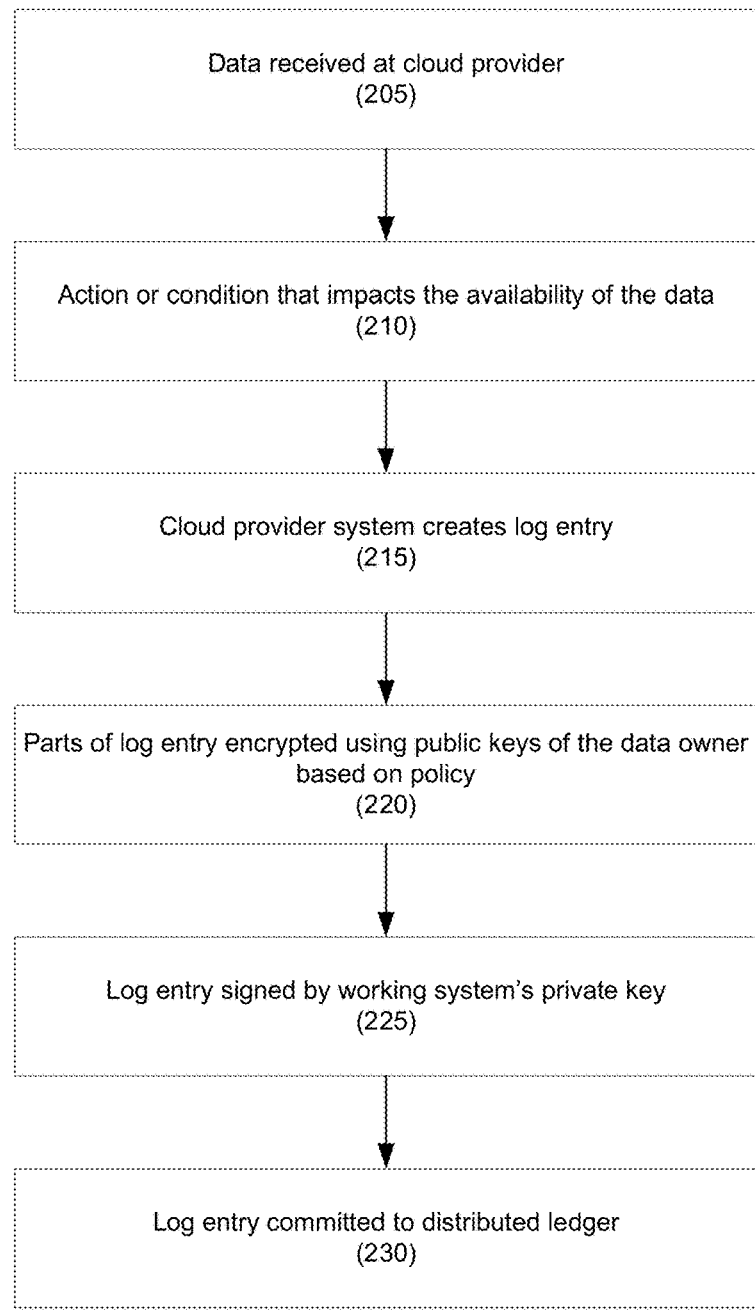
FIG. 2 depicts a method for creating immutable data logs with privacy according to one embodiment.

Referring to FIG. 2, a method for creating immutable data logs with privacy is disclosed according to one embodiment.

In step 205, a cloud provider may receive data from a client. In one embodiment, the cloud provider may be any suitable cloud provider, including cloud providers of software as a service.

In one embodiment, the data may be stored in cloud storage. For example, the data may be encrypted and stored in cloud storage.

In one embodiment, the data may be encrypted with a key for the client that provided the data.

In step 210, an action or condition may take place that may impact the availability or access to the data stored in cloud storage. Examples of such actions or conditions include the receipt of data by the cloud provider, encryption and/or decryption of the data, access attempts to the data, environmental changes, security events, etc. In one embodiment, actions related to any other virtual resources (e.g., virtual desktops, server infrastructure, etc.) that are managed by the cloud provider on behalf of the client may be logged.

In step 215, a cloud provider system creating the action or condition may generate a log entry. In one embodiment, a worker system (i.e., the cloud system that is performing the service on the data) may generate the log entry. The log entry may include a timestamp for the access, the accessing system, the data that was accessed, the action requested (e.g., read, write, delete), a resulting action (e.g., allow, deny, invalid), a destination system (e.g., the system processing the request), and any other information that may be necessary and/or desired.

In step 220, parts of the log entry may be encrypted. For example, the data may be encrypted using a public key for the data owner. In one embodiment, data that is deemed confidential to the cloud provider, unnecessary to disclose, etc. may be further encrypted.

In step 225, the log entry may be signed with a private key for the system creating the log entry and/or for the cloud provider.

In step 230, the log entry may be committed to a distributed ledger, such as a Blockchain-based distributed ledger, an Ethereum-based distributed ledger, or a similar distributed ledger. In one embodiment, other nodes in a distributed ledger network (e.g., distributed ledgers associated with clients of the cloud provider) may further commit the log entry to their distributed ledgers.

In one embodiment, each log entry may have an one-to-one commitment to the distributed ledger. In another embodiment, the log entries may be batched, collected, and/or sent in regular intervals, or when otherwise necessary and/or desired, in order to prevent frequency analysis of those commits.

In one embodiment, it may not be necessary to commit the full content of the log entries directly in the distributed ledger. Instead, a cryptographic signature of the content may be provided to distributed ledger, and the full content, which may be encrypted, may be stored elsewhere.

Thus, using these two techniques. frequency analysis by any third party that has access to the ledger but not the full log in the data store is impossible.

Figure 3:
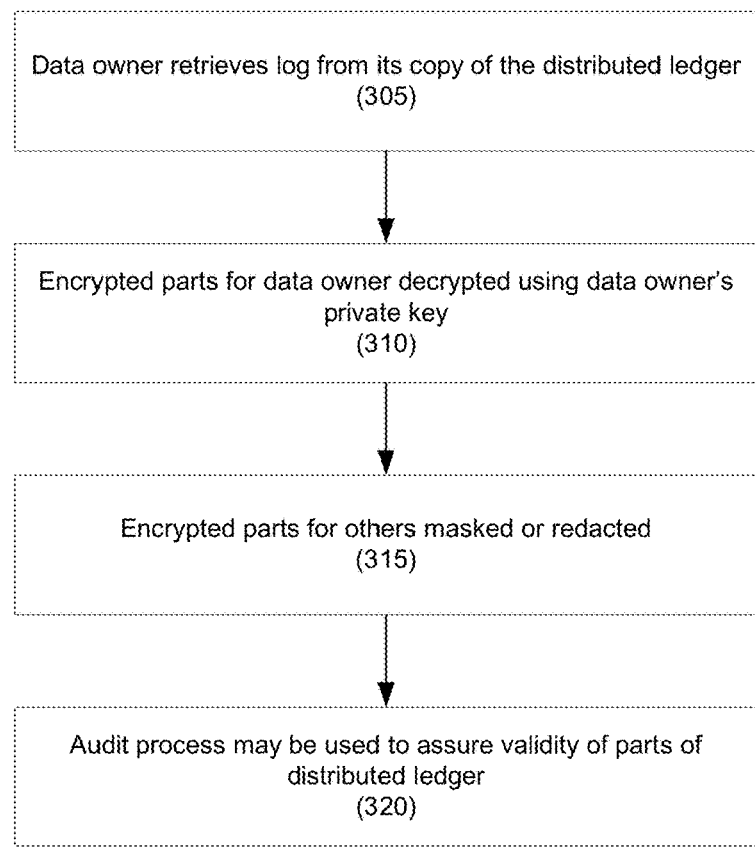
FIG. 3 depicts a method for accessing immutable data logs with privacy according to one embodiment.

Referring to FIG. 3, a method for accessing immutable data logs with privacy is disclosed according to one embodiment.

In step 305, a data owner may retrieve a log entry, such as a data access log entry, from its distributed ledger. In one embodiment, some of the log entry may be in clear text, some may be encrypted with a key for the data owner, some may be encrypted with a key for another data owner, and some may be masked or redacted with a key for the cloud provider.

In another embodiment, a cryptographic signature or digest may be retrieved from a distributed ledger.

In step 310, the encrypted parts of the log entry that are encrypted with the data owner's key (e.g., the data owner's public key) may be decrypted using, for example, the data owner's private key.

In step 315, other portions of the log entry that are encrypted with other data owner's keys, masked, or otherwise hidden may be unavailable to the data owner.

In step 320, an audit process may be used to assure the validity of the log entries. In one embodiment, an audit process may include the verification of integrity of all records in the distributed ledger (e.g., validation of cryptographic signatures within and between each record), and the verification of decryption of record content and validation of any contained signatures.

It should be recognized that the embodiments disclosed herein are not exclusive to each other; features and elements from one embodiment may be used with others as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for maintaining immutable data access logs with privacy comprising:
   in a cloud provider comprising at least one computer processor, the cloud provider having a plurality of clients:
      receiving data from a data owner, wherein the data owner is one of the clients;
      storing the data in cloud storage;
      executing an action or condition that impacts the data stored in cloud storage;
      generating a log entry associated with the action or condition comprising a timestamp for the action or condition, an identification of a system associated with the action or condition, and an identification of the data associated with the action or condition;
      determining, from the log entry, a confidential portion of the log entry;
      encrypting the confidential portion of the log entry with a private key of the cloud provider;

encrypting at least a portion of the timestamp, the identification, and identification of the data associated with the action or condition in the log entry with a public key for the data owner;

signing the log entry including the portion and the confidential portion of the log entry;

committing a cryptographic signature of the encrypted portion in the log entry to a distributed ledger; and storing the log entry including the encrypted portion in a location separate from the distributed ledger, so that the committed log entry is immutable and cryptographically verifiable.

2. The method of claim 1, wherein the data received from the data owner is encrypted.

3. The method of claim 1, wherein the action or condition comprises accessing the data stored in cloud storage.

4. The method of claim 3, wherein the action or condition is part of a service provided by the cloud provider.

5. The method of claim 1, wherein the action or condition comprises encrypting or decrypting the data stored in cloud storage.

6. The method of claim 1, wherein the action or condition comprises an environmental change for the data stored in cloud storage.

7. The method of claim 1, wherein the action or condition comprises a security event with the data stored in cloud storage.

8. The method of claim 1, wherein the distributed ledger comprises a Blockchain-based distributed ledger or an Ethereum-based distributed ledger.

9. A system that maintains immutable data access logs with privacy comprising:

a cloud provider comprising at least one computer processor, the cloud provider having a plurality of clients; and a distributed ledger;

wherein:

the cloud provider receives data from a data owner, wherein the data owner is one of the clients;

the cloud provider stores the data in cloud storage;

the cloud provider executes an action or condition that impacts the data stored in cloud storage;

the cloud provider generates a log entry associated with the action or condition comprising a timestamp for the action or condition, an identification of a system associated with the action or condition, and an identification of the data associated with the action or condition;

the cloud provider determines, from the log entry, a confidential portion of the log entry;

the cloud provider encrypts the confidential portion of the log entry with a private key of the cloud provider;

the cloud provider encrypts at least a portion of the timestamp, the identification, and identification of the data associated with the action or condition in the log entry with a public key for the data owner;

encrypting at least a portion of the timestamp, the identification, and identification of the data associated with the action or condition in the log entry with a public key for the data owner;

the cloud provider signs the log entry including the portion and the confidential portion of the log entry;

the cloud provider commits a cryptographic signature of the encrypted portion in the log entry to a distributed ledger; and storing the log entry including the encrypted portion in a location separate from the distributed ledger, so that the committed log entry is immutable and cryptographically verifiable.

10. The system of claim 9, wherein the data received from the data owner is encrypted.

11. The system of claim 9, wherein the action or condition comprises accessing the data stored in cloud storage.

12. The system of claim 11, wherein the action or condition is part of a service provided by the cloud provider.

13. The system of claim 9, wherein the action or condition comprises encrypting or decrypting the data stored in cloud storage.

14. The system of claim 9, wherein the action or condition comprises an environmental change for the data stored in cloud storage.

15. The system of claim 9, wherein the action or condition comprises a security event with the data stored in cloud storage.

16. The system of claim 9, wherein the public key is maintained in a public key infrastructure by the cloud provider.

17. The system of claim 9, wherein the distributed ledger comprises a Blockchain-based distributed ledger or an Ethereum-based distributed ledger.

* * * * *